United States Patent
Maggiore

(10) Patent No.: US 9,664,475 B1
(45) Date of Patent: May 30, 2017

(54) PREPACKAGED BUG GUN MAGAZINE

(71) Applicant: Loren Maggiore, Santa Monica, CA (US)

(72) Inventor: Loren Maggiore, Santa Monica, CA (US)

(*) Notice: Subject to any disclaimer, the term of this patent is extended or adjusted under 35 U.S.C. 154(b) by 0 days.

(21) Appl. No.: 15/377,078

(22) Filed: Dec. 13, 2016

Related U.S. Application Data

(63) Continuation of application No. PCT/US2016/052021, filed on Sep. 16, 2016.

(51) Int. Cl.
| | |
|---|---|
| *F41B 11/54* | (2013.01) |
| *F41B 11/50* | (2013.01) |
| *F41B 11/55* | (2013.01) |
| *A01M 3/00* | (2006.01) |

(52) U.S. Cl.
CPC ............... *F41B 11/50* (2013.01); *A01M 3/00* (2013.01); *F41B 11/54* (2013.01); *F41B 11/55* (2013.01)

(58) Field of Classification Search
CPC    F41B 11/54; F41B 11/62; F41B 11/00; F41B 11/52; F41A 9/28
USPC ....................... 124/48, 72, 73, 74, 76, 36, 16
See application file for complete search history.

(56) References Cited

U.S. PATENT DOCUMENTS

| | | | |
|---|---|---|---|
| 3,212,489 A | 10/1965 | Merz | |
| 3,672,301 A * | 6/1972 | Abbott | F42B 8/04 102/530 |
| 4,004,565 A * | 1/1977 | Fischer | A61M 37/0069 124/45 |
| 4,760,834 A * | 8/1988 | Chevalier | F41A 9/25 124/51.1 |
| 4,771,757 A * | 9/1988 | Chevalier | F41A 9/25 124/51.1 |
| 5,160,795 A | 11/1992 | Milliman | |
| 5,285,766 A | 2/1994 | Milliman | |
| 5,515,838 A * | 5/1996 | Anderson | F41B 11/723 124/73 |
| 5,613,482 A | 3/1997 | Thai | |

(Continued)

FOREIGN PATENT DOCUMENTS

| | | |
|---|---|---|
| DE | 102008006941 | 7/2009 |
| GB | 2244121 | 11/1991 |

(Continued)

*Primary Examiner* — Michael David
(74) *Attorney, Agent, or Firm* — David A. Belasco; Belasco Jacobs & Townsley, LLP

(57) ABSTRACT

A prepackaged bug gun magazine for a gas powered weapon includes a body adapted to fit within an opening in the weapon. The magazine has a first surface, a second surface and at least one chamber. The length of the chambers extends from the first surface to the second surface. A first frangible sealing membrane is removably affixed to the first surface of the body and seals the first end of the chamber. A second frangible sealing membrane is removably affixed to the second surface of the body and seals the second end of the chamber. Particulate projectiles are located within the chambers and sealed in place by the sealing membranes. An indexing system aligns the chamber with a barrel of the weapon. Discharge causes pressurized gas to breach the first membrane and impact of the particulate projectiles will breach the second membrane, permitting the projectiles to enter the barrel.

10 Claims, 5 Drawing Sheets

(56) References Cited

U.S. PATENT DOCUMENTS

| | | | | |
|---|---|---|---|---|
| 5,711,286 A | * | 1/1998 | Petrosyan | F41B 11/62 |
| | | | | 124/53 |
| 6,393,992 B1 | * | 5/2002 | Vasel | F41B 15/02 |
| | | | | 102/367 |
| 6,745,755 B2 | | 6/2004 | Piccini | |
| 6,752,137 B2 | * | 6/2004 | Brunette | F41B 11/55 |
| | | | | 124/73 |
| 6,772,694 B1 | * | 8/2004 | Pearce, III | F42B 12/50 |
| | | | | 102/370 |
| 7,691,759 B2 | * | 4/2010 | Perry | F41A 21/04 |
| | | | | 124/84 |
| 8,251,051 B2 | | 8/2012 | Maggiore | |
| 8,950,387 B2 | * | 2/2015 | Stevens | F41B 11/70 |
| | | | | 124/56 |
| 2004/0149275 A1 | * | 8/2004 | Vincent | F41B 11/52 |
| | | | | 124/41.1 |
| 2009/0255434 A1 | * | 10/2009 | Pawloski | A01M 27/00 |
| | | | | 102/502 |
| 2010/0275895 A1 | * | 11/2010 | Wenaas | F41B 11/62 |
| | | | | 124/74 |

FOREIGN PATENT DOCUMENTS

| | | |
|---|---|---|
| JP | 07174493 | 7/1995 |
| JP | 09506961 | 7/1997 |
| JP | 3055689 | 1/1999 |
| JP | 3064850 | 1/2000 |
| JP | 20010373568 | 7/2005 |

\* cited by examiner

PREPACKAGED BUG GUN MAGAZINE

RELATED APPLICATION

The instant application is a continuation of Application Serial No. PCT/US2016/052051, filed Sep. 16, 2016, incorporating its contents by reference in its entirety.

FIELD OF INVENTION

This invention relates to the fields of weaponry and insect control, and more specifically to a prepackaged, loaded magazine for a repeating fire weapon.

BACKGROUND OF THE INVENTION

Many methods and devices have been developed for dealing with insect pests. Many people are particularly interested in dealing with flying insects as they tend to be very visible, sometimes noisy and often possessing the capability to bite or sting. Traditional means for killing flying insects include devices such as fly swatters and their equivalent or chemical sprays. The former requires a certain skill and agility to be effective and the latter leaves a potentially harmful chemical residue in the area where used. The present invention addresses these concerns and also provides entertainment to those tasked with removal of insect pests in the form of a gun designed for shooting flying insects. In order to make the gun more effective as well as more entertaining, the present invention provides for rapid, semi-automatic fire requiring only repeated trigger pulls to affect a series of shots. The present invention also includes interchangeable magazines that can be quickly attached to the weapon. Other devices developed to eliminate flying insects or provide similar semi-automatic fire include the following inventions.

U.S. Pat. No. 8,251,051, issued to the present inventor, Patent is directed to a bug killing gun that includes a compressed gas source fluidly connected to a chamber connected to a barrel. A compressed gas release mechanism is connected to the compressed gas source. A projectile storage magazine stores particulate projectiles and is located adjacent the chamber. A projectile loading mechanism moves the projectiles into the chamber from the magazine. A cocking mechanism is mechanically connected to the compressed gas source, the compressed gas release mechanism, and the projectile loading mechanism. A stock houses and supports the compressed gas source, the compressed gas release mechanism, the barrel, the chamber, the projectile storage magazine, the cocking mechanism and the projectile loading mechanism. When the gun is cocked, the projectile loading mechanism loads a predetermined quantity of the particulate projectiles into the chamber. When the compressed gas release mechanism is activated the projectiles are ejected from the chamber into the barrel and expelled from the gun.

German Patent Application No. DE 102008006941, published for Mueller, is directed to a universal housing aperture for mounting an electronic component in a small arm. The aperture has a longitudinal slot provided in a wall, where the aperture is fully or partially changeable in cross section by extension of a shooting mechanism. A striking pin extends to a longitudinal slot in a clamped condition. A safety lever is rotatably supported in the housing and extends into the cross section of the aperture. The aperture is provided below a closing path and behind a region of an ammunition feeder of a weapon, and runs transverse to a longitudinal direction of the weapon.

Japanese Patent Application No. JP20010373568, published for Marco, is directed to a self-actuating firearm comprising a frame, a breechblock, a barrel provided with a bore, a cylinder which is associated with the barrel and forms an internal chamber which is connected to the bore of the barrel, by means of a gas tap, and a piston which is at least partially accommodated in the chamber and can be actuated by the gases that arrive from the bore upon firing. The piston floats with respect to the cylinder and the frame and comprises a portion which is external to the cylinder and is adapted to act with an impulsive action on the breechblock in order to re-cock the firearm upon firing.

U.S. Pat. No. 6,745,755, issued to Piccini, is directed to a magazine of shots for repeating guns, in particular for compressed-air guns, which comprises at least two cylinders in series, front and rear, respectively, the front cylinder provided with N identical chambers for housing the shots and with a crown of N teeth intended to be engaged by a mechanism of rotation, the rear cylinder provided with N−1 chambers for housing the shots and with an aperture of smaller diameter intended to make possible the passage of the firing gas from the valve to the chamber of the front cylinder, which is aligned with the barrel from time to time. The front and rear cylinders are provided with complementary couplings, shaped to interact with one another for a contemporary rotation of the two cylinders only after the first N shots have been fired from the front cylinder.

Japanese Patent Application No. JP3064850U, is directed to a magazine for a toy gas-powered gun. The magazine is in the nature of a spring-loaded clip for a typical automatic pistol except that the "bullets" that are loaded in the clip are small round balls and have no powder charge or shell casings. This arrangement provides self-loading for semi-automatic-type fire capability.

Japanese Patent Application No. JP3055689U, is directed to a magazine for another toy gas-powered gun. The magazine is in the nature of a spring-loaded clip for a typical automatic pistol except that the "bullets" that are loaded in the clip are small round balls and have no powder charge or shell casings. This arrangement provides self-loading for semi-automatic-type fire capability.

Great Britain Patent Application No. GB2244121, published for Jones et al., is directed to an Air Gun with Rotary Magazine. The body of the air gun accommodates a removable magazine immediately behind the breech, for pellets to be loaded one at a time from the magazine into the breech. The magazine comprises a drum which is rotatably mounted within a housing and comprises ten pellet-holding slots around its axis. A torsion spring urges rotation of the drum in indexing steps as controlled by an escapement mechanism comprising a rocking paw. The paw is displaced against the action of a return spring by means of a plunger which projects from a cocking arm of a conventional cocking mechanism of the gun. The plunger is arranged to actuate the escapement only towards the end of a cocking stroke of the arm. A loading ram/air transfer tube is reciprocated, in effecting the cooking action, to withdraw from one slot in the drum and enter a next slot to load a fresh pellet into the breech.

U.S. Pat. No. 5,613,482, issued to Thai, is directed to a spring-powered toy gun that ejects small disks, of the type children collect, giving the ejected disks a spin to improve their flight. The disks are first loaded into a separate spring-operated magazine which is then inserted into an aperture on the gun. A transparent window in the gun allows a user to view the magazine's top disk and any insignia thereon. The top of the magazine bears two retaining members that hold the top disk in place. These retaining members are spaced apart from the magazine by the thickness of one disk and, thus, set the thickness of the disks that can be fired from the gun. The top disk is ejected from the gun by a planar propulsion lever driven by a main spring. Pulling back on a trigger moves the main spring and the propulsion lever away from a rest position. When the trigger is pulled fully, the main spring is automatically released and snaps forward causing the propulsion lever to move forward and strike the top disk propelling it from the gun. Because the tip of the propulsion member is angled, it strikes the disk off-center imparting a spin to the disk.

It is an objective of the present invention to provide a device for killing flying insects. It is a further objective to provide such a device that uses non-toxic means for killing the insects. It is a still further objective of the invention to provide preloaded, sealed magazines containing the particulate matter used to kill the insects. It is yet a further objective to provide sealed magazines that are rapidly interchangeable, compact and self-contained. It is another objective to provide magazines that are capable of being reloaded by a reloading facility. It is still another objective to provide a magazine system that is entertaining to use and inexpensive to operate. Finally, it is an objective of the present invention to provide an insect killing device that is durable, inexpensive and simple for the user to master.

While some of the objectives of the present invention are disclosed in the prior art, none of the inventions found include all of the requirements identified.

SUMMARY OF THE INVENTION

The present invention addresses all of the deficiencies of prior art bug killing gun inventions and satisfies all of the objectives described above.

(1) A prepackaged bug gun magazine for a gas powered weapon providing the desired features may be constructed from the following components. A body is provided. The body is adapted to fit within an opening in the gas powered weapon and has a first surface, a second surface and at least one chamber. Each of the chambers has a first length and a first width. The first length extends from the first surface at a first end of the chamber to the second surface at a second end of the chamber.

A first frangible sealing membrane is provided. The first sealing membrane is removably affixed to the first surface of the body and seals the first end of the chamber. A second frangible sealing membrane is provided. The second sealing membrane is removably affixed to the second surface of the body and seals the second end of the chamber. Particulate projectiles are provided. The projectiles are located within the chambers and sealed in place by the first and second frangible sealing membranes. An indexing system is provided. The indexing system is adapted to align the at least one chamber with a barrel of the gas powered weapon. Discharge of the gas powered weapon will cause pressurized gas to breach the first frangible sealing membrane and impact of the particulate projectiles will breach the second frangible sealing membrane, permitting the projectiles to enter the barrel and be ejected from the gas powered weapon.

(2) In a variant of the invention, the indexing device includes a first series of uniformly spaced features and a second series of uniformly spaced features. The first series of features is located at either of the first and second surfaces of the body. The second series of features is located at a peripheral edge of the body.

(3) In another variant, the first series of features are selected from the group that includes apertures, notches, gear teeth and protrusions.

(4) In still another variant, the gas powered weapon is in the form of a break-action revolving rifle or pistol that has a central magazine support shaft and magazine indexing mechanism. The magazine further includes a central aperture, the aperture is sized to fit slidably about the central magazine support shaft. The chambers are located radially about and parallel to the central aperture. The first series of features is located radially about the central aperture and adapted to engage the magazine indexing mechanism to serially align each of the chambers with the barrel.

(5) In yet another variant, the gas powered weapon is in the form of a pivoting cylinder-action revolving rifle or pistol that has a central magazine support rod. The support rod is attached to a pivoting crane and has a free distal end. The crane is held in place with a latching device. The rifle or pistol has a magazine indexing mechanism. The magazine further includes a central mounting aperture. The mounting aperture is sized to fit slidably about the central magazine support rod. The chambers are located radially about and parallel to the central mounting aperture. The features are located radially about the central mounting aperture and adapted to engage the magazine indexing mechanism to serially align each of the chambers with the barrel.

(6) In a further variant of the invention, the first and second frangible sealing membranes are fabricated from materials selected from the group that includes paper, plastic, metal foil and fabric.

(7) In still a further variant, a method of making a prepackaged bug gun magazine for a gas powered weapon, includes the steps of: Providing a body. The body is adapted to fit within an opening in the gas powered weapon. The body has a first surface, a second surface and at least one chamber. Each of the chambers has a first length and a first width. The first length extends from the first surface at a first end of the chamber to the second surface at a second end of the chamber. Providing a first frangible sealing membrane, removably affixing the first sealing membrane to the first surface and sealing the first end of the chamber. Providing a second frangible sealing membrane, removably affixing the second sealing membrane to the second surface and sealing the second end of the chamber. Providing particulate projectiles, disposing the projectiles within the chambers and sealing the particulate projectiles in place with the first and second frangible sealing membranes. Providing an indexing system on the body. The indexing system is adapted to align the at least one chamber with a barrel of the gas powered weapon. Discharge of the gas powered weapon will cause pressurized gas to breach the first frangible sealing membrane and impact of the particulate projectiles will breach the second frangible sealing membrane, permitting the projectiles to enter the barrel and be ejected from the gas powered weapon.

(8) In yet a further variant, the method of making a prepackaged bug gun magazine for a gas powered weapon includes the step of providing an indexing device that includes a first series of uniformly spaced features and a second series of uniformly spaced features. The first series of features is located at either of the first and second surfaces of the body. The second series of features is located at a peripheral edge of the body.

(9) In another variant of the invention, the features are selected from the group includes apertures, notches, gear teeth and protrusions.

(10) In still another variant, the method of making a prepackaged bug gun magazine for a gas powered weapon wherein the gas powered weapon is in the form of a break-action revolving rifle or pistol that has a central magazine support shaft and magazine indexing mechanism, the method of making the magazine further includes the steps of: providing a central aperture, the aperture is sized to fit slidably about the central magazine support shaft. Locating the chambers radially about and parallel to the central aperture. Adapting the first series of features located radially about the central aperture to engage the magazine indexing mechanism to serially align each of the chambers with the barrel.

(11) In yet another variant, the method of making a prepackaged bug gun magazine for a gas powered weapon wherein the gas powered weapon is in the form of a pivoting cylinder-action revolving rifle or pistol that has a central magazine support rod, the support rod attached to a pivoting crane, the crane has a free distal end and is held in place with a latching device, the rifle or pistol has a magazine indexing mechanism. The method of making the magazine further includes the steps of: providing a central mounting aperture, the mounting aperture is sized to fit slidably about the central magazine support rod. Locating the chambers radially about and parallel to the central mounting aperture. Adapting the first series of features located radially about the central mounting aperture to engage the magazine indexing mechanism to serially align each of the chambers with the barrel.

(12) In a final variant of the invention, the method of making a prepackaged bug gun magazine for a gas powered weapon wherein the first and second frangible sealing membranes are fabricated from materials selected from the group that includes paper, plastic, metal foil and fabric.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 1-9 illustrate a prepackaged bug killing gun magazine 10 for a gas powered weapon 14 providing the desired features that may be constructed from the following components. A body 18 is provided. The body 18 is adapted to fit within an opening 22 in the gas powered weapon 14 and has a first surface 26, a second surface 30 and at least one chamber 34. Each of the chambers 34 has a first length 38 and a first width 42. The first length 38 extends from the first surface 26 at a first end 46 of the chamber 34 to the second surface 30 at a second end (not shown) of the chamber 34.

As illustrated in FIGS. 2, 3, 6 and 8, a first frangible sealing membrane 54 is provided. The first sealing membrane 54 is removably affixed to the first surface 26 of the body 18 and seals the first end 46 of the chamber 34. A second frangible sealing membrane 58 is provided. The second sealing membrane 58 is removably affixed to the second surface 30 of the body 18 and seals the second end of the chamber 34. Particulate projectiles 62 are provided. The projectiles 62 are located within the chambers 34 and sealed in place by the first 54 and second 58 frangible sealing membranes. An indexing system 66 is provided. The indexing system 66 is adapted to align the at least one chamber 34 with a barrel 70 of the gas powered weapon 14. Discharge of the gas powered weapon 14 will cause pressurized gas (not shown) to breach the first frangible sealing membrane 54 and impact of the particulate projectiles 62 will breach the second frangible sealing membrane 58, permitting the projectiles 62 to enter the barrel 70 and be ejected from the gas powered weapon 14.

Figure 1:
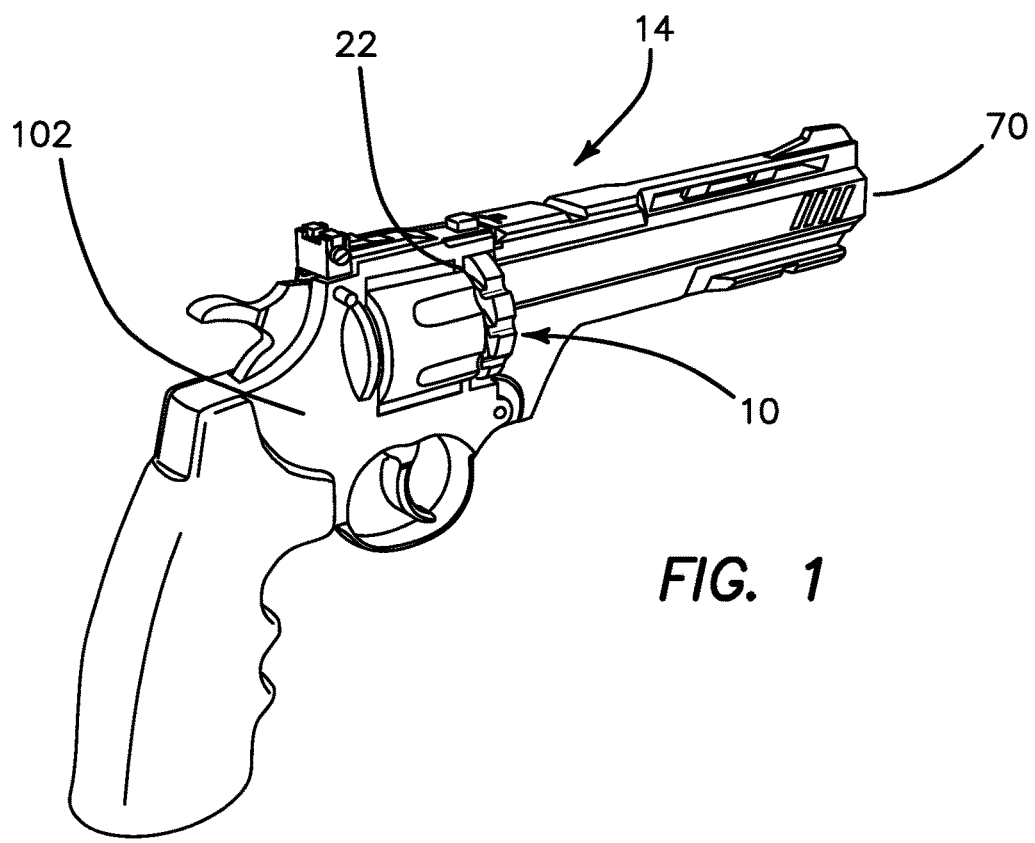
FIG. 1 is a perspective view of a gas powered, break-action revolver equipped with a prepackaged bug killing gun magazine with the action of the revolver closed.

(2) In a variant of the invention, the indexing system 66 includes a first series of uniformly spaced features 78 and a second series of uniformly spaced features 80. The first series of features 78 is located at either of the first 26 and second 30 surfaces of the body 18. The second series of features 84 is located at a peripheral edge 88 of the body 18.

(3) In another variant, the first series of features 78 is selected from the group that includes apertures (not shown), notches (not shown), gear teeth (not shown) and protrusions 94.

Figure 2:
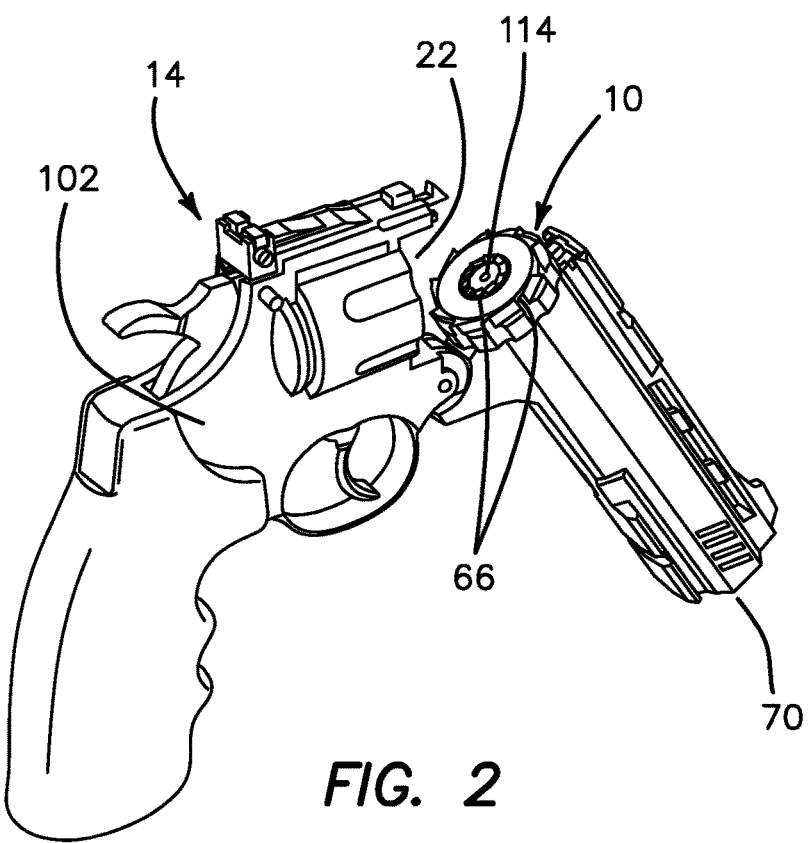
FIG. 2 is a perspective view of the FIG. 1 embodiment with the action of the revolver open and an unused prepackaged bug killing gun magazine in place.
Figure 3:
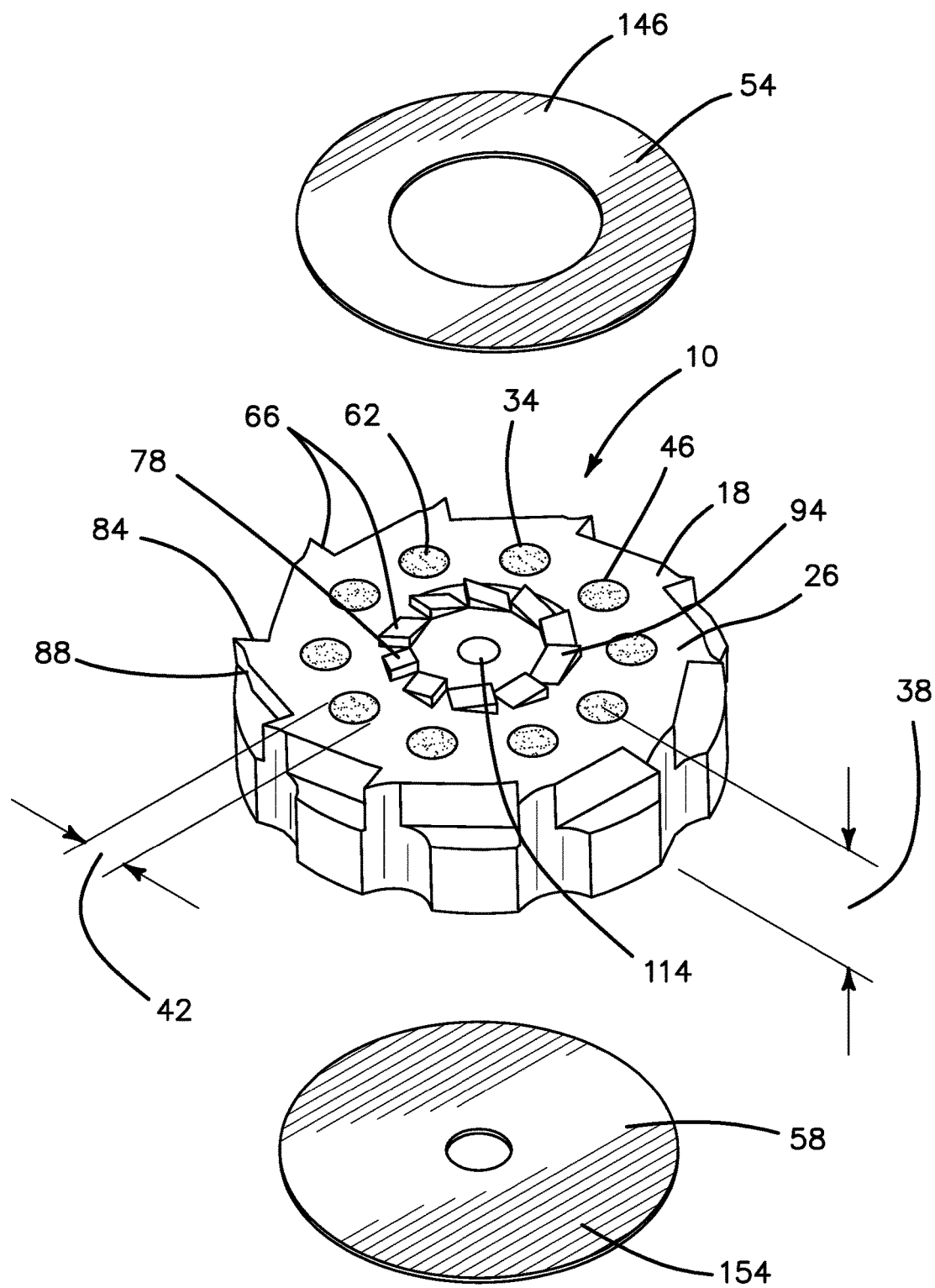
FIG. 3 is a close up exploded perspective view of the prepackaged bug killing gun magazine illustrating the first and second frangible sealing membranes, particulate projectiles, indexing system and central mounting aperture of the magazine.
Figure 4:
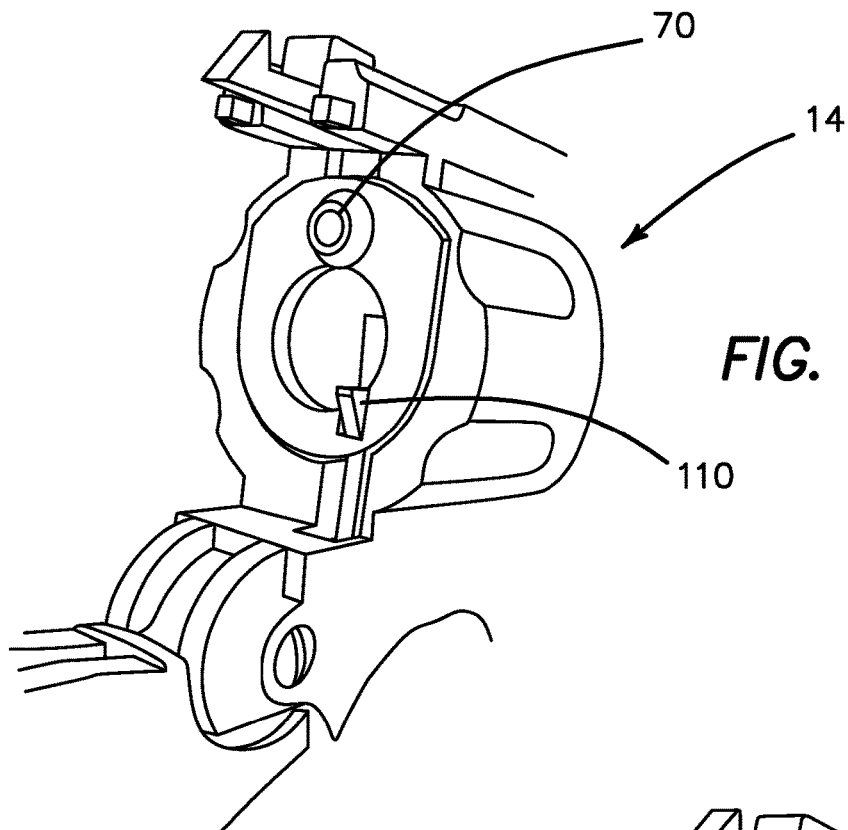
FIG. 4 is a perspective view of the indexing mechanism of the FIG. 1 embodiment prior to discharge of the weapon.
Figure 5:
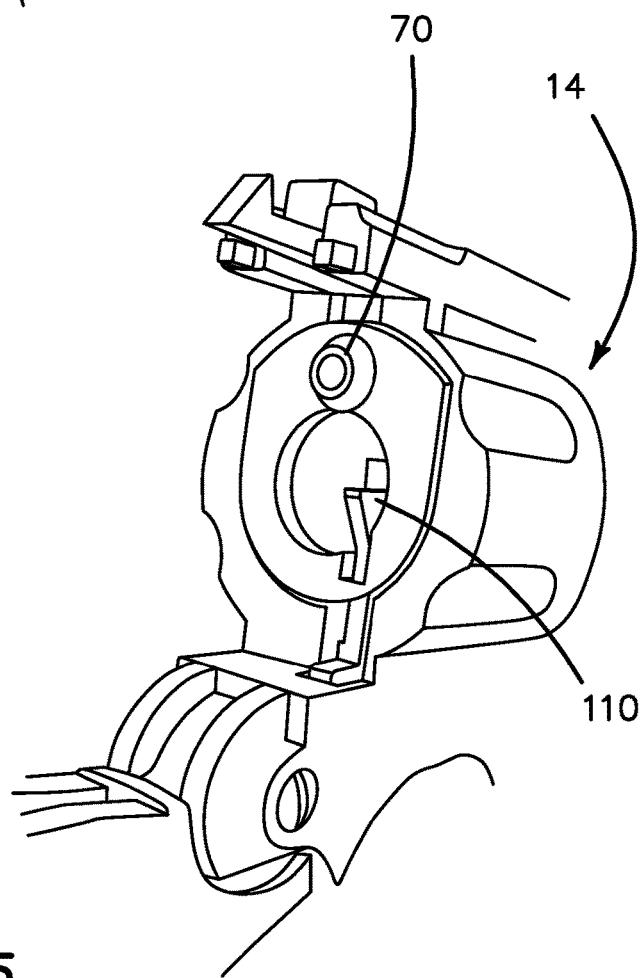
FIG. 5 is a perspective view of the indexing mechanism of the FIG. 1 embodiment subsequent to discharge of the weapon illustrating a cylinder rotation stop.
Figure 6:
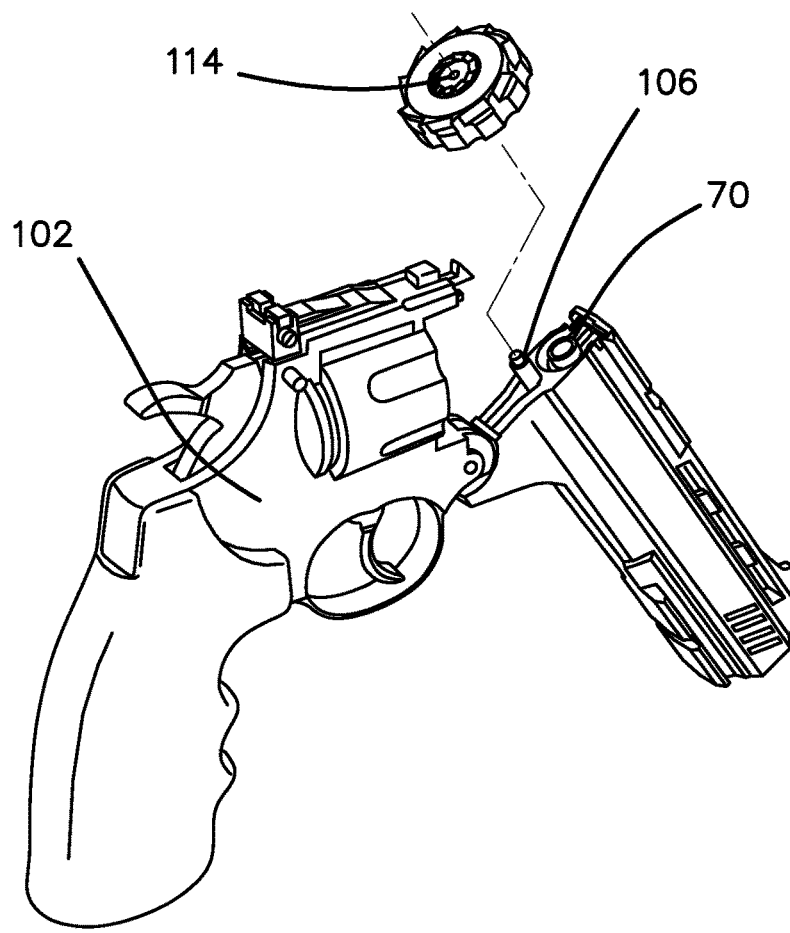
FIG. 6 is a perspective view of the FIG. 1 embodiment with the action of the revolver open and an unused prepackaged bug killing gun magazine ready for mounting on the central magazine support shaft.

(4) In still another variant, as illustrated in FIGS. 1, 2, and 4-6, the gas powered weapon 14 is in the form of a break-action revolving rifle (not shown) or pistol 102 that has a central magazine support shaft 106 and magazine indexing mechanism 110. As illustrated in FIGS. 2,3 and 6, the magazine 10 further includes a central aperture 114. The aperture 114 is sized to fit slidably about the central magazine support shaft 106. The chambers 34 are located radially about and parallel to the central aperture 114. The first series of features 78 is located radially about the central aperture 114 and adapted to engage the magazine indexing mechanism 110 to serially align each of the chambers 34 with the barrel 70.

Figure 7:
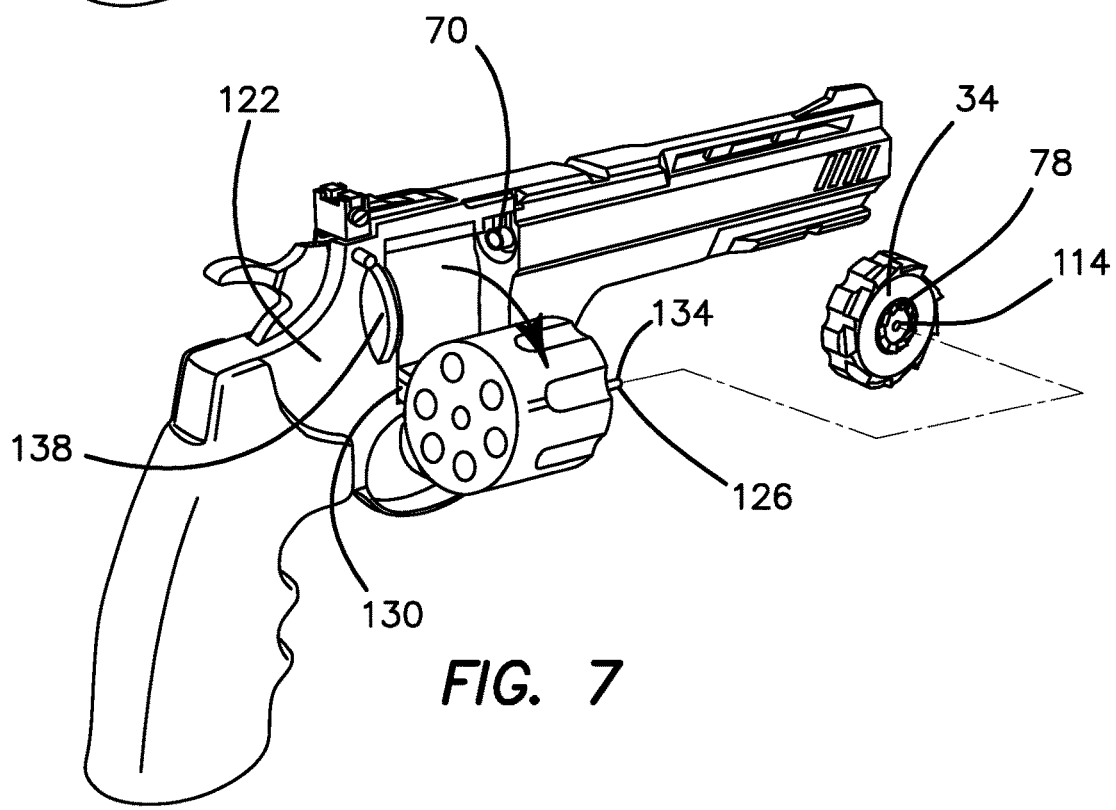
FIG. 7 is a perspective view of a gas powered, swing-out cylinder revolver equipped with a prepackaged bug killing gun magazine removed and ready for loading with the action of the revolver open.
Figure 8:
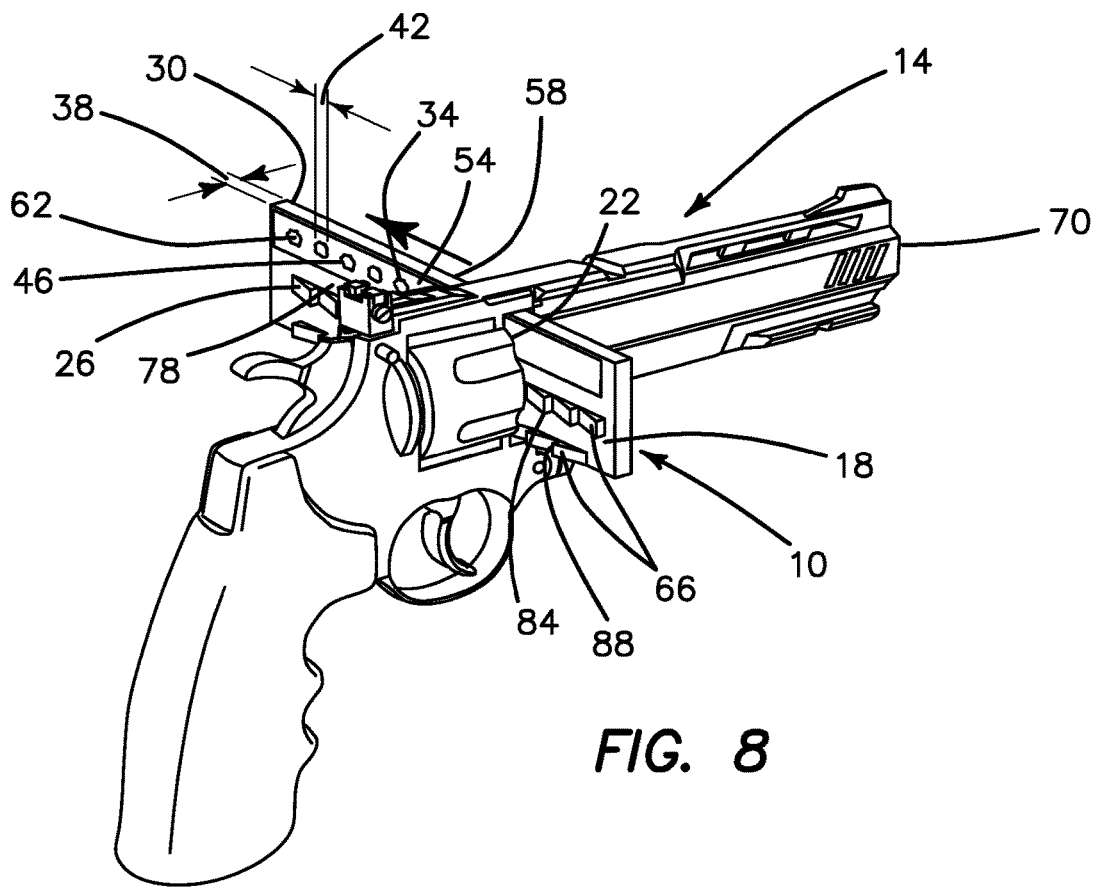
FIG. 8 is a perspective view of a gas powered, sliding magazine pistol equipped with a prepackaged bug killing gun magazine in place and ready for use.
Figure 9:
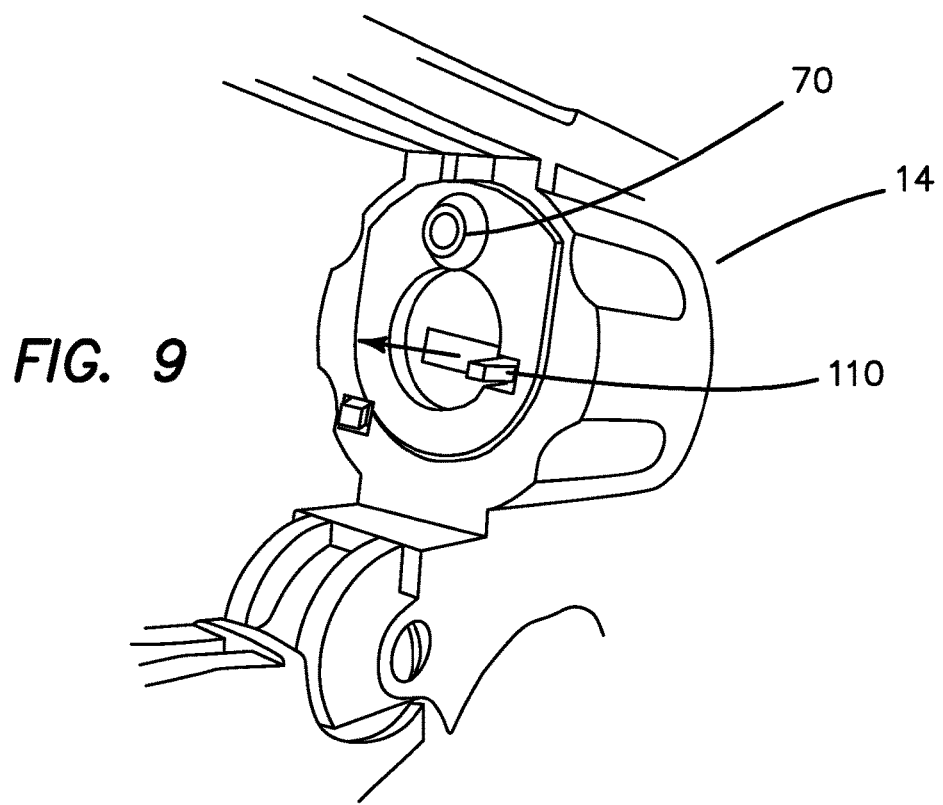
FIG. 9 is a perspective view of the indexing mechanism of the FIG. 8 embodiment prior to discharge of the weapon.

(5) In yet another variant, as illustrated in FIG. 7, the gas powered weapon 14 is in the form of a pivoting cylinder-action revolving rifle (not shown) or pistol 122 that has a central magazine support rod 126. The support rod 126 is attached to a pivoting crane 130 and has a free distal end 134. The crane 130 is held in place with a latching device 138. The rifle or pistol 122 has a magazine indexing mechanism (not shown). The magazine 10 further includes a central mounting aperture 114. The mounting aperture 114 is sized to fit slidably about the central magazine support rod 126. The chambers 34 are located radially about and parallel to the central mounting aperture 114. The first series of features 78 is located radially about the central mounting aperture 114 and adapted to engage the magazine indexing mechanism to serially align each of the chambers 34 with the barrel 70.

(6) In a further variant of the invention, as illustrated in FIGS. 2, 3 and 6-8, the first 54 and second 58 frangible sealing membranes are fabricated from materials selected from the group that includes paper 146, plastic (not shown), metal foil 154 and fabric (not shown).

(7) In still a further variant, a method of making a prepackaged bug gun magazine 10 for a gas powered weapon 14, includes the steps of: Providing a body 18. The body 18 is adapted to fit within an opening 22 in the gas powered weapon 14. The body 18 has a first surface 26, a second surface 30 and at least one chamber 34. Each of the chambers 34 has a first length 38 and a first width 42. The first length 38 extends from the first surface 26 at a first end 46 of the chamber 34 to the second surface 30 at a second end 50 of the chamber 34. Providing a first frangible sealing membrane 54, removably affixing the first sealing membrane 54 to the first surface 26 and sealing the first end 46 of the chamber 34. Providing a second frangible sealing membrane 58, removably affixing the second sealing membrane 58 to the second surface 30 and sealing the second end 50 of the chamber 34. Providing particulate projectiles 62, disposing the projectiles 62 within the chambers 34 and sealing the particulate projectiles 62 in place with the first 54 and second 58 frangible sealing membranes. Providing an indexing system 66 on the body 18. The indexing system 66 is adapted to align the at least one chamber 34 with a barrel 70 of the gas powered weapon 14. Discharge of the gas powered weapon 14 will cause pressurized gas (not shown) to breach the first frangible sealing membrane 54 and impact of the particulate projectiles 62 will breach the second frangible sealing membrane 58, permitting the projectiles 62 to enter the barrel 70 and be ejected from the gas powered weapon 14.

(8) In yet a further variant, the method of making a prepackaged bug gun magazine 10 for a gas powered weapon 14 includes the step of providing an indexing system 66 that includes a first series of uniformly spaced features 78 and a second series of uniformly spaced features 80. The first series of features 78 is located at either of the first 26 and second 30 surfaces of the body 18. The second series of features 84 is located at a peripheral edge 88 of the body 18.

(9) In another variant of the invention, the features are selected from the group includes apertures (not shown), notches (not shown), gear teeth (not shown) and protrusions 94.

(10) In still another variant, the method of making a prepackaged bug gun magazine 10 for a gas powered weapon 14 wherein the gas powered weapon 14 is in the form of a break-action revolving rifle (not shown) or pistol 102 that has a central magazine support shaft 106 and magazine indexing mechanism 110, the method of making the magazine 10 further includes the steps of: providing a central aperture 114, the aperture 114 is sized to fit slidably about the central magazine support shaft 106. Locating the chambers 34 radially about and parallel to the central aperture 114. Adapting the first series of features 78 located radially about the central aperture 114 to engage the magazine indexing mechanism 110 to serially align each of the chambers 34 with the barrel 70.

(11) In yet another variant, the method of making a prepackaged bug gun magazine 10 for a gas powered weapon 14 wherein the gas powered weapon 14 is in the form of a pivoting cylinder-action revolving rifle (not shown) or pistol 122 that has a central magazine support rod 126, the support rod 126 attached to a pivoting crane 130, the crane 130 has a free distal end 134 and is held in place with a latching device 138, the rifle or pistol 122 has a magazine indexing mechanism 142. The method of making the magazine 10 further includes the steps of: providing a central mounting aperture 114, the mounting aperture 114 is sized to fit slidably about the central magazine support rod 126. Locating the chambers 34 radially about and parallel to the central mounting aperture 114. Adapting the features 78 located radially about the central mounting aperture 114 to engage the magazine indexing mechanism 142 to serially align each of the chambers 34 with the barrel 70.

(12) In a final variant of the invention, the method of making a prepackaged bug gun magazine 10 for a gas powered weapon 14 wherein the first 54 and second 58 frangible sealing membranes are fabricated from materials selected from the group that includes paper 146, plastic (not shown), metal foil 154 and fabric (not shown).

The prepackaged bug killing gun magazine 10 has been described with reference to particular embodiments. Other modifications and enhancements can be made without departing from the spirit and scope of the claims that follow.

The invention claimed is:
1. A prepackaged bug gun magazine for a gas powered weapon, comprising:
 a body, said body adapted to fit within an opening in said gas powered weapon and having a first surface, a second surface and at least one chamber;
 said at least one chamber having a first length and a first width, said first length extending from said first surface at a first end of said chamber to said second surface at a second end of said chamber;
 a first frangible sealing membrane, said first sealing membrane being removably affixed to said first surface and sealing said first end of said chamber;
 a second frangible sealing membrane, said second sealing membrane being removably affixed to said second surface and sealing said second end of said chamber;
 particulate projectiles, said projectiles being disposed within said chamber and sealed in place by said first and second frangible sealing membranes;
 an indexing system, said indexing system adapted to align said at least one chamber with a barrel of said gas powered weapon;
 said indexing system comprising:
  a first series of uniformly spaced features, said features being disposed at either of said first and second surfaces of said body; and
  a second series of uniformly spaced features, said features being disposed at a peripheral edge of said body; and
 wherein discharge of said gas powered weapon will cause pressurized gas to breach said first frangible sealing membrane and impact of said particulate projectiles will breach said second frangible sealing membrane, permitting said projectiles to enter said barrel and be ejected from said gas powered weapon.

2. The prepackaged bug gun magazine for a gas powered weapon, as described in claim 1, wherein said first series of features are selected from the group comprising apertures, notches, gear teeth and protrusions.

3. The prepackaged bug gun magazine for a gas powered weapon, as described in claim 2, wherein said gas powered weapon is in the form of a break-action revolving rifle or pistol having a central magazine support shaft and magazine indexing mechanism, said magazine further comprises:
 a central aperture, said aperture being sized to fit slidably about said central magazine support shaft;
 said chambers being disposed radially about and parallel to said central aperture; and
 said first series of features disposed radially about said central aperture and adapted to engage said magazine indexing mechanism to serially align each of said chambers with said barrel.

4. The prepackaged bug gun magazine for a gas powered weapon, as described in claim 2, wherein said gas powered weapon is in the form of a pivoting cylinder-action revolving rifle or pistol having a central magazine support rod, said support rod attached to a pivoting crane, having a free distal end, said crane being held in place with a latching device, said rifle or pistol having a magazine indexing mechanism, said magazine further comprises:
 a central mounting aperture, said mounting aperture being sized to fit slidably about said central magazine support rod;
 said chambers being disposed radially about and parallel to said central mounting aperture; and
 said first series of features disposed radially about said central mounting aperture and adapted to engage said magazine indexing mechanism to serially align each of said chambers with said barrel.

5. The prepackaged bug gun magazine for a gas powered weapon, as described in claim 1, wherein said first and second frangible sealing membranes are fabricated from materials selected from the group comprising:
 paper, plastic, metal foil and fabric.

6. A method of making a prepackaged bug gun magazine for a gas powered weapon, comprising the steps of:
 providing a body, said body adapted to fit within an opening in said gas powered weapon and having a first surface, a second surface and at least one chamber;
 said at least one chamber having a first length and a first width, said first length extending from said first surface at a first end of said chamber to said second surface at a second end of said chamber;
 providing a first frangible sealing membrane, removably affixing said first sealing membrane to said first surface and sealing said first end of said chamber;
 providing a second frangible sealing membrane, removably affixing said second sealing membrane to said second surface and sealing said second end of said chamber;
 providing particulate projectiles, disposing said projectiles within said chamber and sealing said particulate projectiles in place with said first and second frangible sealing membranes;
 providing an indexing system on said body, said indexing system adapted to align said at least one chamber with a barrel of said gas powered weapon;
 said indexing system comprising a first series of uniformly spaced features and a second series of uniformly spaced features, said first series of features being disposed at either of said first and second surfaces of said body, and said second series of features being disposed at a peripheral edge of said body; and
 wherein discharge of said gas powered weapon will cause pressurized gas to breach said first frangible sealing membrane and impact of said particulate projectiles will breach said second frangible sealing membrane, permitting said projectiles to enter said barrel and be ejected from said gas powered weapon.

7. The method of making a prepackaged bug gun magazine for a gas powered weapon, as described in claim 6, wherein said features are selected from the group comprising:
 apertures, notches, gear teeth and protrusions.

8. The method of making a prepackaged bug gun magazine for a gas powered weapon, as described in claim 7, wherein said gas powered weapon is in the form of a break-action revolving rifle or pistol having a central magazine support shaft and magazine indexing mechanism, the method of making said magazine further comprising the steps of:
 providing a central aperture, said aperture being sized to fit slidably about said central magazine support shaft;
 disposing said chambers radially about and parallel to said central aperture; and
 adapting said first series of features disposed radially about said central aperture to engage said magazine indexing mechanism to serially align each of said chambers with said barrel.

9. The method of making a prepackaged bug gun magazine for a gas powered weapon, as described in claim 7, wherein said gas powered weapon is in the form of a pivoting cylinder-action revolving rifle or pistol having a central magazine support rod, said support rod attached to a pivoting crane, said crane having a free distal end and being held in place with a latching device, said rifle or pistol having a magazine indexing mechanism, the method of making said magazine further comprising the steps of:
 providing a central mounting aperture, said mounting aperture being sized to fit slidably about said central magazine support rod;
 disposing said chambers radially about and parallel to said central mounting aperture; and
 adapting said first series of features disposed radially about said central mounting aperture to engage said magazine indexing mechanism to serially align each of said chambers with said barrel.

10. The method of making a prepackaged bug gun magazine for a gas powered weapon, as described in claim 6, wherein said first and second frangible sealing membranes are fabricated from materials selected from the group comprising:
 paper, plastic, metal foil and fabric.

* * * * *